US011102762B2

(12) United States Patent
Baldemair et al.

(10) Patent No.: US 11,102,762 B2
(45) Date of Patent: Aug. 24, 2021

(54) UCI RESOURCE DETERMINATION

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 125 days.

(21) Appl. No.: 15/778,271

(22) PCT Filed: Apr. 3, 2018

(86) PCT No.: PCT/SE2018/050349
§ 371 (c)(1),
(2) Date: May 23, 2018

(87) PCT Pub. No.: WO2018/186791
PCT Pub. Date: Oct. 11, 2018

(65) Prior Publication Data
US 2020/0084761 A1    Mar. 12, 2020

Related U.S. Application Data

(60) Provisional application No. 62/480,892, filed on Apr. 3, 2017.

(51) Int. Cl.
*H04W 72/04*    (2009.01)
*H04L 1/00*    (2006.01)
(Continued)

(52) U.S. Cl.
CPC ....... *H04W 72/0413* (2013.01); *H04L 1/0026* (2013.01); *H04L 1/1671* (2013.01);
(Continued)

(58) Field of Classification Search
CPC ............. H04W 72/0413; H04L 5/0055; H04L 5/0057; H04L 5/0044; H04L 1/1812; H04L 1/0026; H04L 1/1671; H04L 1/1896
See application file for complete search history.

(56) References Cited

U.S. PATENT DOCUMENTS

2016/0183212 A1    6/2016   Suzuki et al.
2019/0123881 A1*   4/2019   Lee ...................... H04L 1/1671

FOREIGN PATENT DOCUMENTS

EP       2760171 A2      7/2014
WO    2016182406 A1     11/2016

OTHER PUBLICATIONS

Unknown, Author, "Simultaneous transmission of CQI and ACK/NACK", Huawei, HiSilicon, 3GPP TSG RAN WG1 meeting #62bis, R1-105123, Xi'an, China, Oct. 11-15, 2010, 1-6.

* cited by examiner

*Primary Examiner* — Thai Nguyen
(74) *Attorney, Agent, or Firm* — Murphy, Bilak & Homiller, PLLC

(57) ABSTRACT

According to an aspect, a CSI/HARQ feedback-transmitting node receives control information indicating resources in which data is to be received by the node. The control information includes an ACK/NACK Resource Indicator (ARI) having a value indicating one of a plurality of predetermined sets of control channel resources for transmitting CQI feedback and HARQ feedback. The node determines a feedback payload size parameter, based on a number of bits to be reported for CQI feedback and for HARQ feedback, and selects, from a plurality of control channel resources in the predetermined set of control channel resources indicated by the value of the ARI, one of the control channel resources of the predetermined set, based on
(Continued)

the feedback payload size parameter. The node transmits CQI feedback and HARQ feedback in the selected control channel resource.

26 Claims, 7 Drawing Sheets

(51) Int. Cl.
  *H04L 1/16* (2006.01)
  *H04L 1/18* (2006.01)
  *H04L 5/00* (2006.01)
(52) U.S. Cl.
  CPC .......... *H04L 1/1812* (2013.01); *H04L 1/1896* (2013.01); *H04L 5/0044* (2013.01); *H04L 5/0055* (2013.01); *H04L 5/0057* (2013.01)

300

```
┌─────────────────────────────────────────┐
│ RECEIVE CONTROL INFORMATION INDICATING  │
│ RESOURCES IN WHICH DATA IS TO BE RECEIVED BY │
│ THE NODE, THE CONTROL INFORMATION COMPRISING │
│ AN ARI HAVING A VALUE INDICATING ONE OF A │
│ PLURALITY OF PREDETERMINED SETS OF CONTROL │
│ CHANNEL RESOURCES FOR TRANSMITTING CQI  │
│ FEEDBACK AND HARQ FEEDBACK              │
│ 302                                     │
└─────────────────────────────────────────┘
                    │
                    ▼
┌─────────────────────────────────────────┐
│ DETERMINE A FEEDBACK PAYLOAD SIZE PARAMETER, │
│ BASED ON A NUMBER OF BITS TO BE REPORTED FOR │
│ CQI FEEDBACK AND FOR HARQ FEEDBACK      │
│ 304                                     │
└─────────────────────────────────────────┘
                    │
                    ▼
┌─────────────────────────────────────────┐
│ SELECT, FROM A PLURALITY OF CONTROL CHANNEL │
│ RESOURCES IN THE PREDETERMINED SET OF CONTROL │
│ CHANNEL RESOURCES INDICATED BY THE VALUE OF │
│ THE ARI, ONE OF THE CONTROL CHANNEL RESOURCES │
│ OF THE PREDETERMINED SET, BASED ON THE  │
│ FEEDBACK PAYLOAD SIZE PARAMETER         │
│ 306                                     │
└─────────────────────────────────────────┘
                    │
                    ▼
┌─────────────────────────────────────────┐
│ TRANSMIT CQI FEEDBACK AND HARQ FEEDBACK IN THE │
│ SELECTED CONTROL CHANNEL RESOURCE       │
│ 308                                     │
└─────────────────────────────────────────┘
```

*FIG. 3*

UCI RESOURCE DETERMINATION

TECHNICAL FIELD

The present disclosure relates to physical layer control signaling of a wireless device operating within wireless communications networks, including transmission of Channel Quality Information (CQI) and Hybrid Automatic Repeat Requests (HARQs) feedback.

BACKGROUND

CQI feedback is needed to inform a transmitter about channel quality at the receiving end. In Long Term Evolution (LTE), two kinds of CQI feedback are distinguished: periodic CQI feedback, also referred to as "periodic CQI," and aperiodic CQI feedback, also referred to as "aperiodic CQI."

In aperiodic CQI, the transmitting node explicitly requests a transmission of CQI feedback. The triggering may happen via a triggering bit in a Downlink Control Information (DCI) message. If the triggering is done in an uplink grant, e.g., for scheduled data, the scheduler can adjust the size of the scheduled resource to accommodate both the uplink data and the CQI feedback.

Periodic CQI is semi-statically configured and occurs at periodic instances. Together with the time pattern, a periodic resource is configured that should be used for the periodic CQI reporting.

LTE uses a HARQ protocol where the receiver informs the transmitter about success (ACK)/no success (NACK) of the corresponding transmission. The resources for ACK/NACK transmission are typically signaled as a combination of dynamic signaling (in the DCI message) and semi-statically configured parameters.

LTE uses one HARQ ACK/NACK feedback bit per transport block. In case of spatial bundling, feedback of two Multiple Input Multiple Output (MIMO) transport blocks can be bundled (e.g., using a logical AND operation) into a single value. Furthermore, when Carrier Aggregation (CA) is used, it is often the case that more downlink carriers are configured than uplink carriers and/or HARQ feedback transmission may even be limited to a single component carrier. Also, in a Time Division Duplex (TDD) protocol having more downlink than uplink slots, HARQ feedback of multiple downlink slots must be conveyed in fewer uplink slots. Depending on the configuration, a few bits (e.g., in the case of Frequency Division Duplex (FDD) without CA) or many bits (e.g., in the case of TDD with downlink-heavy CA) must be conveyed per feedback occurrence.

In the standardization of the 5$^{th}$-Generation radio access technology often referred to as New Radio (NR), support for ACK/NACK feedback down to one bit per code block (large transport blocks are segmented into multiple code blocks) has been agreed to. This can increase the number of ACK/NACK feedback bits to report in NR compared to LTE. Also, operations in unlicensed bands can increase the number of HARQ feedback bits.

If a user equipment (UE) has data to transmit in the uplink but no scheduled uplink data, it can transmit a Scheduling Request (SR) on a small dedicated resource requesting uplink data resources. Physical Uplink Control Channel (PUCCH) is the channel used for Uplink Control Information (UCI), which includes ACK/NACK, CQI, and SR. For an aperiodic CQI report triggered in an uplink grant, PUSCH resources to send the report on are available as part of the granted resources.

For periodic CQI reports, PUCCH resources are provisioned as part of the CQI reporting configuration. Also, PUCCH resources for SR are semi-statically configured.

PUCCH resources for ACK/NACK (AN) in LTE are either assigned implicitly or explicitly. For implicit resource allocation, the PUCCH resource upon which ACK/NACK feedback is transmitted is derived from the time-frequency position in which the scheduling PDCCH has been transmitted.

In the explicit PUCCH resource allocation, a UE is semi-statically configured with multiple PUCCH resources and an ACK/NACK Resource Indicator (ARI) sent in a downlink grant selects one of the configured resources, for use in reporting HARQ feedback for at least the data corresponding to the downlink grant.

In LTE, aperiodic CQI is only transmitted if Physical Uplink Shared Channel (PUSCH) resources are scheduled. If aperiodic CQI should be transmitted together with ACK/NACK, this is done on PUSCH since PUSCH resources are available anyway.

In conventional systems including LTE, different methods are applied for periodic CQI feedback together with HARQ, depending on the HARQ feedback size:

PUCCH Format 2a/2b: For one or two HARQ feedback bits, the CQI can either be dropped or transmitted together with the HARQ feedback on CQI resources. For larger ACK/NACK feedback sizes, the CQI is dropped since neither the ACK/NACK resources nor the CQI resources are sufficient to accommodate both feedback types and ACK/NACK feedback is transmitted on ACK/NACK resources.

PUCCH Format 3: If the combined payload size of ACK/NACK, the Channel State Information (CSI) and SR is less than or equal to 22 bits, the combined payload is transmitted using PUCCH Format 3. If the combined payload size exceeds 22 bits, spatial bundling is applied to the ACK/NACK bits. If the combined payload size of spatially bundled ACK/NACK, CSI, and SR is less than or equal to 22 bits, spatially bundled ACK/NACK, CSI, and SR is transmitted using PUCCH Format 3; otherwise CSI is dropped and ACK/NACK together with SR is transmitted using PUCCH Format 3. PUCCH Format 4 and 5 use similar procedures as PUCCH Format 3.

If ACK/NACK feedback reporting and other UCI (CQI, SR) collide, the UE could simultaneously transmit both over PUCCH. This, however, is not optimal since a combined report could be more efficient. Depending on the frequency allocation of the two PUCCH transmissions, intermodulation products can occur requiring power back-off of the UE and thus reducing coverage.

It is therefore a problem to determine how to provision resources for a combined UCI transmission, i.e., when simultaneously ACK/NACK and/or CQI and/or SR should be reported.

SUMMARY

Embodiments disclosed herein involve explicit PUCCH resource allocation, where a UE is configured with multiple PUCCH resources and an ACK/NACK Resource Indicator (ARI) selects one of the configured resources. According to some embodiments described herein, a UE is configured, per each of several ARI code-points, with multiple differently-sized PUCCH resources. The ARI thus indicates which set of resources to be used—the ARI is considered together with the combined UCI payload to determine exactly which PUCCH resource. Such embodiments provide better support for combined UCI transmissions, which leads to less dropping of certain UCI types (for example, dropping CQI in favor of ACK/NACK) or better link performance of combined UCI transmissions, since larger PUCCH resource can be used.

According to some embodiments, a method of operating a node, such as a feedback transmitting node, to report CQI feedback and HARQ feedback includes receiving control information indicating resources in which data is to be received by the node. The control information includes an ARI having a value indicating one of a plurality of predetermined sets of control channel resources for transmitting CQI feedback and HARQ feedback. The method also includes determining a feedback payload size parameter, based on a number of bits to be reported for CQI feedback and for HARQ feedback, and selecting, from a plurality of control channel resources in the predetermined set of control channel resources indicated by the value of the ARI, one of the control channel resources of the predetermined set, based on the feedback payload size parameter. The method further includes transmitting CQI feedback and HARQ feedback in the selected control channel resource.

According to some embodiments, a method of operating a node, such as a feedback-receiving node, to receive CQI feedback and HARQ feedback includes transmitting control information indicating resources in which data is to be received by another node. The control information includes an ARI having a value indicating one of a plurality of predetermined sets of control channel resources for transmitting CQI feedback and HARQ feedback. The method also includes receiving CQI feedback and HARQ in a control channel resource of a plurality of control channel resources in the predetermined set indicated by the value of the ARI. The control channel resource is selected based on a number of bits to be reported for CQI feedback and for HARQ feedback.

According to some embodiments, a node configured to report CQI feedback and HARQ feedback includes at least one processor and a memory. The memory includes instructions executable by the at least one processor whereby the node is operable to receive control information indicating resources in which data is to be received by the node, the control information comprising an ARI having a value indicating one of a plurality of predetermined sets of control channel resources for transmitting CQI feedback and HARQ feedback. The node is also operable to determine a feedback payload size parameter, based on a number of bits to be reported for CQI feedback and for HARQ feedback and select, from a plurality of control channel resources in the predetermined set of control channel resources indicated by the value of the ARI, one of the control channel resources of the predetermined set, based on the feedback payload size parameter. The node is also operable to transmit CQI feedback and HARQ feedback in the selected control channel resource.

According to some embodiments, a node configured to receive CQI feedback and HARQ feedback includes at least one processor and a memory. The memory includes instructions executable by the at least one processor whereby the node is operable to transmit control information indicating resources in which data is to be received by another node. The control information includes an ARI having a value indicating one of a plurality of predetermined sets of control channel resources for transmitting CQI feedback and HARQ feedback. The node is also operable to receive CQI feedback and HARQ in a control channel resource of a plurality of control channel resources in the predetermined set indicated by the value of the ARI, the control channel resource selected based on a number of bits to be reported for CQI feedback and for HARQ feedback.

Further embodiments may include functional implementations, computer program products, and non-transitory computer readable media that store instructions that, when executed by processing circuit, perform the operations of the embodiments described above.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 is a flowchart illustrating a method by a feedback-transmitting node, according to some embodiments.

DETAILED DESCRIPTION

Figure 1:
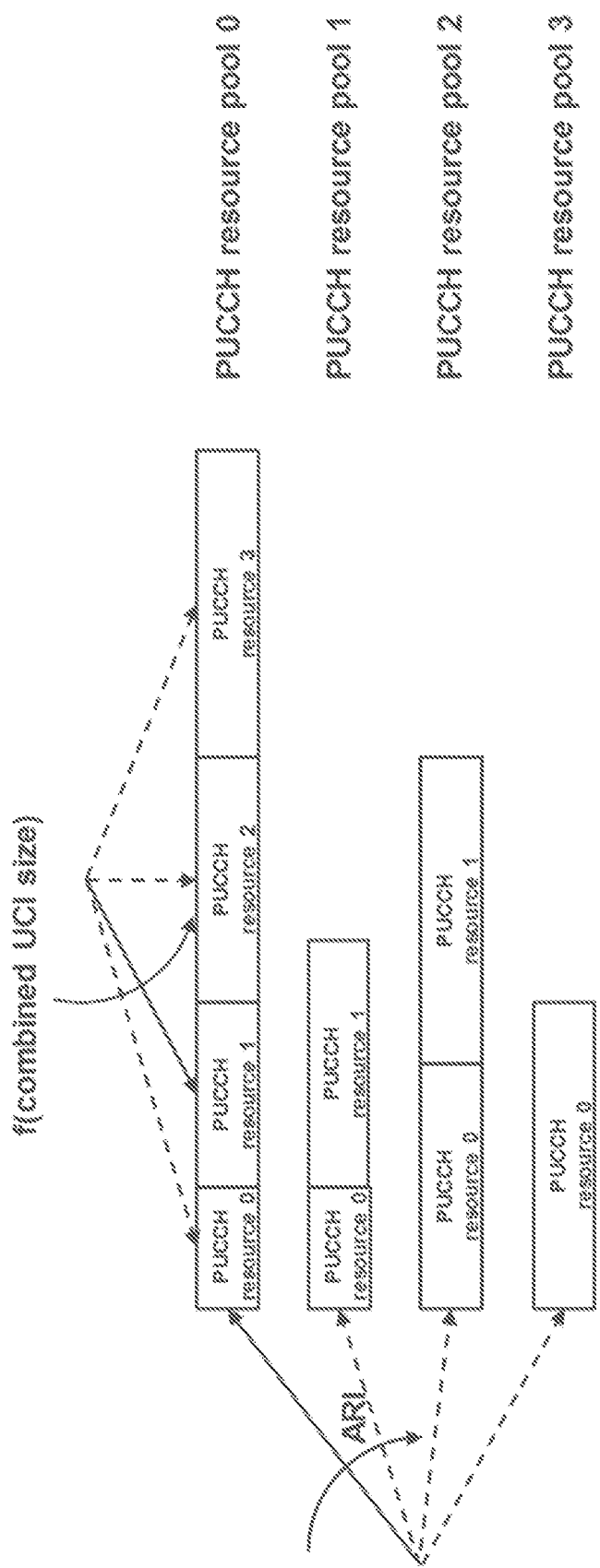
FIG. 1 illustrates resource pool selection as may be implemented in an embodiment.

The embodiments set forth below represent information to enable those skilled in the art to practice the embodiments and illustrate the best mode of practicing the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

In LTE, different rules have been setup as to how colliding ACK/NACK and other UCI reporting can be handled. For the problem of simultaneous transmission of periodic CQI and ACK/NACK, an alternative solution could be used.

In LTE, simultaneous transmission of ACK/NACK and periodic CQI typically uses CQI resources, rather than ACK/NACK resources. In LTE, where the number of ACK/NACK bits to report is typically small, this is fine, since in most cases the payload increase is modest. However, in NR with, for example, per-code-block feedback, the number of ACK/NACK feedback bits can become very large, making it impractical or impossible to squeeze them into the CQI resource. One possible approach is to configure a UE with multiple differently-sized periodic CQI resources, such that the UE can choose the appropriate resource based on a combined UCI payload size. However, this solution requires transmission of the combined report on the CQI resource, which is not always desired.

If an aperiodic CQI resource is triggered in a downlink grant and no uplink resources for the CQI report are scheduled at the same time, it must be decided on which resources the CQI report will be sent. If the CQI report collides with an ACK/NACK transmission, the combined report could be sent on the ACK/NACK resource. However, the combined UCI payload may exceed the available ACK/NACK resource. The same applies if the aperiodic CQI report is triggered by an uplink grant and PUSCH resources would be available, but the UE is configured with simultaneous transmission of PUSCH and PUCCH and should use ACK/NACK PUCCH resources.

The techniques described herein address these issues by providing for explicit PUCCH resource allocation where a UE is configured with multiple PUCCH resources and an ACK/NACK Resource Indicator (ARI) selects one of the configured resources. According to some of the embodiments described herein, a UE is configured with multiple differently-sized PUCCH resources per each of several ARI code-points. Herein, the multiple differently-sized PUCCH resources associated with a given ARI value are generally referred to as a "set" or "pool"—thus, the UE is configured with multiple sets or pools of PUCCH resources, each corresponding to an ARI value. It will be understood, of course, that this same configuration may be described differently, e.g., with the same-sized resources across multiple ARIs being considered as a "set," "pool," or "group." For consistency, however, the term "set" as used herein, unless the context clearly indicates otherwise, is used to refer to the PUCCH resources associated with a given ARI value.

As discussed in further detail below, the ARI may then indicate which set of differently sized resources that is to be used—the ARI is considered together with the combined UCI payload to determine exactly which PUCCH resource the UE should use. Such embodiments provide better support for combined UCI transmissions, which leads to less dropping of certain UCI types (for example, dropping CQI in favor of ACK/NACK) or better link performance of combined UCI transmissions, since larger PUCCH resources can be used in a more flexible way.

In one example, a feedback-transmitting node, such as a UE, is configured with predetermined sets of control channel resources. The predetermined sets may be control channel resource pools, and the control channel resources in each control channel resource pool may be PUCCH resources. At least one resource pool contains multiple PUCCH resources that have at least two different sizes. An ARI indicates the PUCCH resource pool to select from among the multiple PUCCH resource pools. One of the multiple PUCCH resources in this PUCCH resource pool is selected as a function of the combined UCI payload to report. It should be noted that the order in which the ARI and UCI payload size are considered makes no difference. The UCI payload size might be considered first, for example, to identify a PUCCH resource from each of several PUCCH resource pools—the UCI payload size thus corresponds to a predetermined group of PUCCH resources that cuts across the "resource pools" as discussed above. Then, the ARI can be used to identify which of the specific PUCCH resources in that group that should be used.

As used herein, the term "combined resources", or alternatively. "combined transmission resources", refers to the collection of time/frequency resources used to transmit a set of signals or channels. A combination of resources need not be contiguous in time or frequency with each other. Where each of the separate signals or channels occupies its own distinct set of transmission resources, the term "combined resources" refers to the collection that includes all of the distinct sets. In some cases, multiple separate signals or channels may be mathematically or otherwise combined and transmitted using the resources usually used for only some of (or even just one of) the separate signals.

FIG. 1 shows an example of how the ARI, which is typically received in control information indicating resources in which data is to be received by the node, e.g., in downlink control information (DCI) sent via a Physical Downlink Control Channel (PDCCH), is used to select PUCCH resource pool 2, which includes PUCCH resource 0 and PUCCH resource 1. Selection of PUCCH resource 0 or PUCCH resource 1 within the PUCCH resource pool 2 is based on a function of the combined UCI payload. "Function of the combined UCI payload" could, in a simple case, be just the sum over all UCI types to be reported, such as in a combined ACK/NACK+CQI+SR report. This would be the number of ACK/NACK bits plus CQI bits plus SR bits, i.e. $N_{tot}=N_{AN}+N_{CQI}+N_{SR}$. However, different payload types may be weighted differently. For instance, ACK/NACK bits have higher performance requirements than CQI bits, so another possibility would be $N_{tot}=w_{AN}N_{AN}+w_{CQI}N_{CQI}+w_{SR}N_{SR}$ with different weights. Other combining algorithms can be considered as well. It is also possible to set one or more of the weights equal to zero, if the corresponding information field should not influence the PUCCH resource selection. Feedback information other than ACK/NAK, CQI, and SR could easily be added in the calculation along the same lines as above.

In the example above, it has been assumed that $N_{AN}$ is the number of ACK/NACK bits the UE has to report, relating to the numbers of downlink assignments the UE has received. In a simple case, 1 bit per downlink assignment is needed; however, MIMO configuration and per-codeblock ACK/NACK can increase this number. Thus, the number of bits $N_{AN}$ is a function of the number of downlink assignments $N_{DL}$ for which a given report is meant to apply. The DCI scheduling of a downlink transmission may also influence if and how many bits should be reported for a received assignment.

If the UE misses some downlink assignments (or incorrectly decodes some of them), it would calculate a wrong $N_{AN}$, which could result in the UE selecting a different PUCCH resource (since it calculates a different N_tot than g/eNB does) than g/eNB, which knows the number of actual scheduled downlink assignments.

The number $N_{AN}$ could thus be replaced, in some embodiments, by a nominal number that does not necessarily reflect the number of actual received DL assignments, i.e., in the above equations, $N_{AN}^{nom}$ would be used instead of $N_{AN}$. In the following, some possibilities are used that can be used to inform the UE about the nominal number $N_{AN}^{nom}$.

In one possibility, if a UE reports ACK/NACK in slot n, it could be configured with a reporting time window length $N_{win}$, i.e., it should report ACK/NACK for downlink assignments received in slots $n-N_{win}$ to n-1. The window can either count slots (i.e., uplink and downlink slots, but of course, it would not receive downlink assignments in uplink slots) or only downlink slots (this assumes the UE knows which slots are downlink). The UE would then assume a bitmap of size $N_{win}$ and a mapping between the $N_{win}$ slots and each bit in the bitmap and for each received downlink assignment fill in ACK or NACK at the appropriate position in the bitmap. Bit positions corresponding to slots the UE did not receive a downlink assignment for are set to NACK. The g/eNB knows for which slots to expect a true ACK/NACK feedback and for which it expects a filler NACK (for those slots it did not schedule) and can use this information in decoding.

If a UE is configured with carrier aggregation, multi-bit feedback per transport block (code-block (group) based feedback), MIMO, or bundling of some slots into a single ACK/NACK bit this needs to be considered when determining the size of the bitmap. For example, if a UE is configured with carrier aggregation of three component carriers which should report ACK/NACK on this PUCCH and a MIMO scheme requiring two feedback bits per slot the bitmap would have a size of 3×2×$N_{win}$. For carrier aggregation, it can either be the number of configured carriers or the number of activated carriers. The size of the bitmap would correspond to $N_{AN}^{nom}$.

In another possibility, a UE is configured with a number of HARQ processes and how many bits it should report per HARQ process. This may correspond to multi-bit feedback per transport block, i.e., code-block (group)-based feedback, for example. The bitmap size could be determined based on the number of configured HARQ processes and bits per HARQ process that should be reported using this PUCCH. Also, here the MIMO scheme needs to be considered. The size of the bitmap would correspond to $N_{AN}^{nom}$.

In one possibility, a UE is semi-statically configured with $N_{AN}^{nom}$.

In another possibility, the number $N_{AN}^{nom}$ is included in at least one DCI that schedules a downlink assignment that should be acknowledged in this PUCCH. Preferably, this information is included in more than one DCI since if the UE misses the DCI containing this information, it does not know $N_{AN}^{nom}$. $N_{AN}^{nom}$ can be directly provided as a number or as an index into a configured or hard coded table. The configured table could, for example, correspond to the payload sizes of the individual resources of the, via ARI, selected PUCCH resource pool.

In a further possibility, the number $N_{AN}^{nom}$ could be the payload size of the smallest PUCCH resource in the selected PUCCH resource pool. The g/eNB knows how many bits are needed to report feedback for all scheduled downlink assignments (UE may miss a downlink assignment, but it is very unlikely it wrongly detects a DCI not addressed to it). The g/eNB would thus select and signal with ARI, a PUCCH resource pool that is the smallest resource capable to at least feed back the ACK/NACK bits. The smallest resource pool does not need to match the number of ACK/NACK bits exactly, it can also be larger.

In another possibility, $N_{AN}^{nom}$ is provided as part of the PUCCH resource pool configuration. The UE receives ARI and selects the corresponding PUCCH resource pool and also the $N_{AN}^{nom}$ value valid for this PUCCH resource pool.

Figure 2:
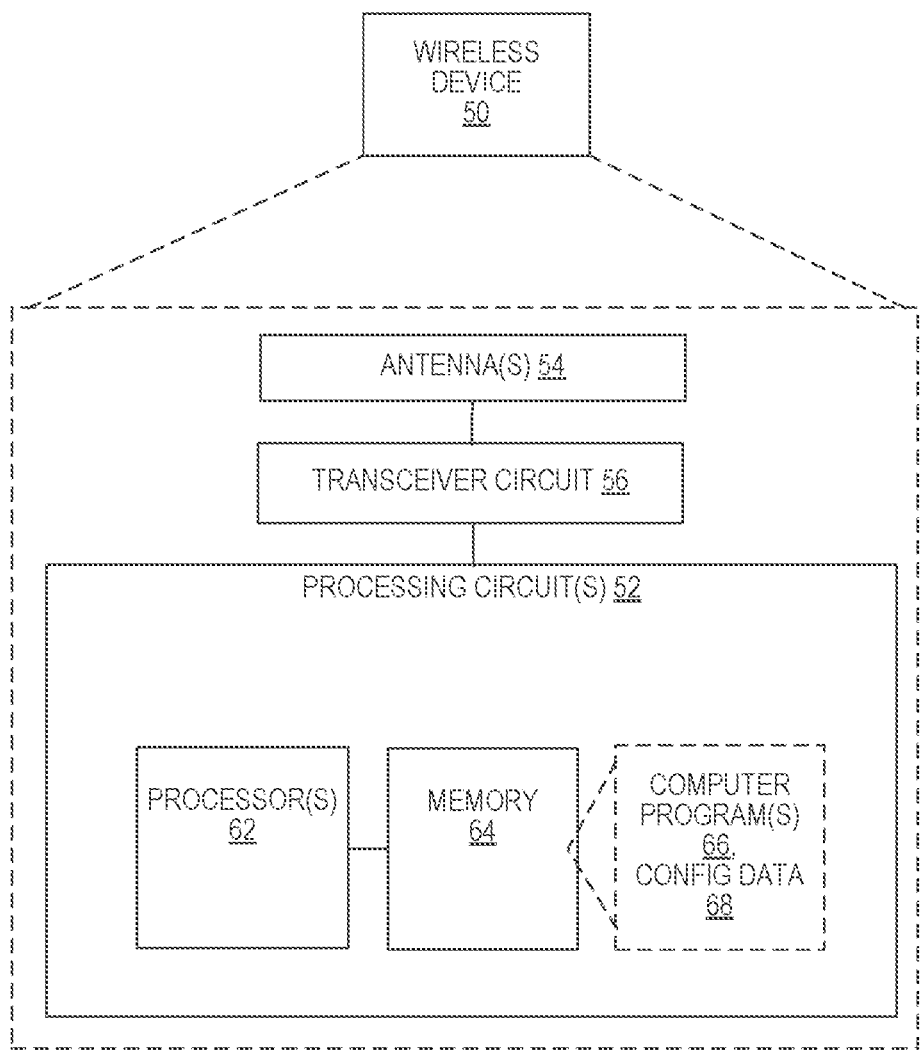
FIG. 2 is a block diagram illustrating a wireless device, according to some embodiments.
Figure 4:
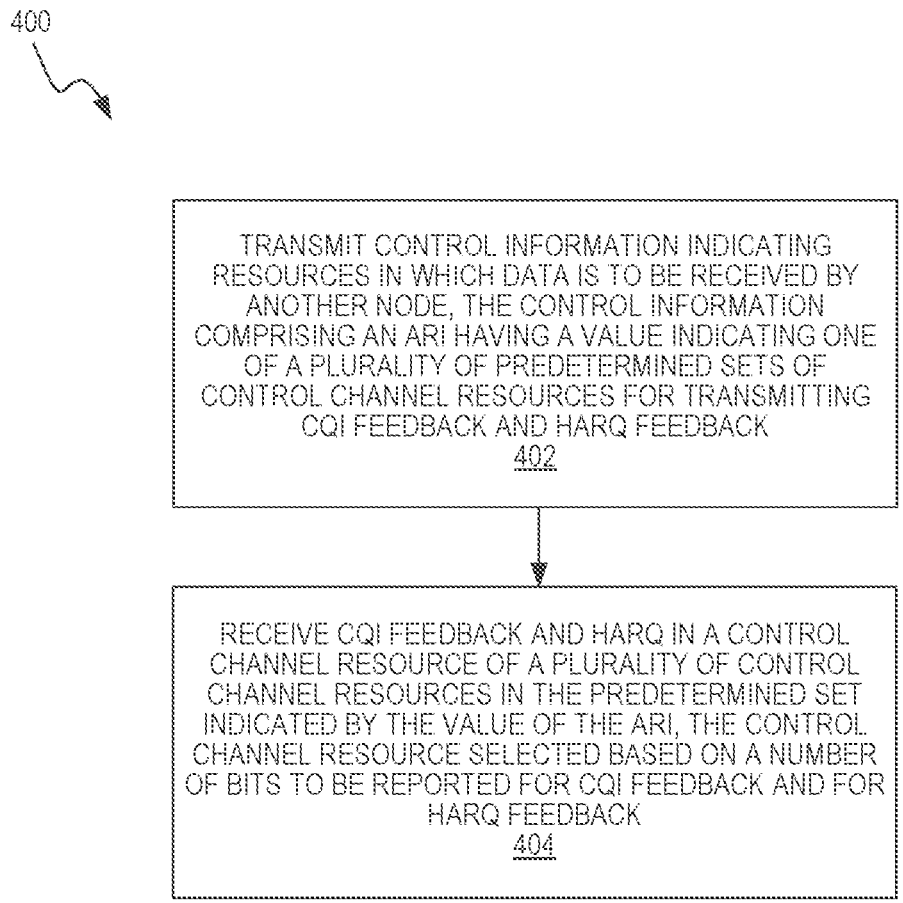
FIG. 4 is a flowchart illustrating a method by a feedback-receiving node, according to some embodiments.

FIG. 2 illustrates a block diagram of a wireless device 50 in a wireless communication system (e.g., a cellular communications system) in which embodiments of the present disclosure may be implemented. The wireless device 50 may be a UE. The term "UE" is used herein in its broad sense to mean any wireless device. As such, the terms "wireless device" and "UE" may be used interchangeably herein. In general, the wireless device 50 may additionally represent a target device, a D2D UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dongles, Customer Premises Equipment (CPE), an IoT (Internet of Things) capable device, or any other device capable of communicating with a 5G and/or NR network, etc.

As illustrated in FIG. 2, the wireless device 50 includes processing circuitry 52 comprising one or more processors 62 (e.g., Central Processing Units (CPUs), Application Specific Integrated Circuits (ASICs), Field Programmable Gate Arrays (FPGAs), and/or the like) and a memory 64 that stores computer programs 68 and, optionally, configuration data 68. The wireless device 50 also includes transceiver circuitry 56, including one or more transmitters or receivers coupled to one or more antennas 54. In some embodiments, the functionality of the wireless device 50 described above may be fully or partially implemented in software (e.g., computer programs 66) that is stored in the memory 64 and executed by the processor(s) 62.

In some embodiments, a carrier containing the computer program products described herein is provided. The carrier is one of an electronic signal, an optical signal, a radio signal, or a computer readable storage medium (e.g., a non-transitory computer readable medium such as memory).

In some embodiments, a computer program including instructions which, when executed by at least one processor, causes the at least one processor of the wireless device 50 to carry out the functionality of a feedback-transmitting node in communication with a feedback-receiving node, such as an access point of the wireless communication system. The wireless device 50 is operable to report CQI feedback and HARQ feedback. The wireless device 50 is then operable to receive control information indicating resources in which data is to be received by the node, the control information comprising an ARI having a value indicating one of a plurality of predetermined sets of control channel resources for transmitting CQI feedback and HARQ feedback. Referring to FIG. 1, for example, the ARI value may indicate one of PUCCH resource pools 0 to 3. The wireless device 50 is also operable to determine a feedback payload size parameter, based on a number of bits to be reported for CQI feedback and for HARQ feedback, and select, from a plurality of control channel resources in the predetermined set of control channel resources indicated by the value of the ARI, one of the control channel resources of the predetermined set, based on the feedback payload size parameter. The wireless device 50 is then operable to transmit CQI feedback and HARQ feedback in the selected control channel resource.

It will be appreciated that these operations can be considered in a different order than described above, with exactly the same results. Referring to FIG. 1, for example, it can be seen that the UCI size determines which of four groups of PUCCH resources the PUCCH resource to be used is to be selected from, such as the group consisting of those PUCCH resources labeled "PUCCH resource 0" in each of PUCCH resource pools 0 to 3. Then, the ARI received in the downlink control information identifies which of those four PUCCH resources is to be used.

The wireless device 50 may be configured to perform the method 300 shown in FIG. 3. The method 300 includes receiving control information indicating resources in which data is to be received by the node, the control information comprising an ARI having a value indicating one of a plurality of predetermined sets of control channel resources for transmitting CQI feedback and HARQ feedback (block 302). Here, the term "set" refers to one or several resources, which may be of different sizes, that are associated with a given ARI value—in FIG. 1, for example, each of the PUCCH resource pools 0 to 3 could be considered a "set." It will be appreciated, of course, that the technique illustrated in FIG. 3 does not depend on the use of that specific terminology. The method 300 also includes determining a feedback payload size parameter, based on a number of bits to be reported for CQI feedback and for HARQ feedback (block 304). The method 300 further includes selecting, from a plurality of control channel resources in the predetermined set of control channel resources indicated by the value of the ARI, one of the control channel resources of the predetermined set, based on the feedback payload size parameter (block 306). The method 300 then includes transmitting CQI feedback and HARQ feedback in the selected control channel resource (block 308).

In some cases, the control information indicating resources in which data is to be received by the node is downlink control information received from an access point of a wireless network, and the predetermined sets of control channel resources for transmitting CQI feedback and HARQ feedback are uplink control channel resources. In other cases, the control information indicating resources in which data is to be received by the node is downlink control information received from another node engaged in device-to-device communications with the node. The HARQ feedback may be for at least data received in the resources indicated in the control information.

The feedback payload size parameter may be determined further based on whether a scheduling request bit is to be sent in the selected control channel resource. The feedback payload size parameter may be computed as a weighted sum of at least a number of CQI feedback bits and a number of HARQ feedback bits, with a weight applied to the number of CQI feedback bits differing from a weight applied to the number of HARQ feedback bits. The feedback payload size parameter may also be computed based on a number of HARQ feedback bits that is in turn based on a predetermined nominal number of HARQ feedback bits.

The predetermined nominal number of HARQ feedback bits may be determined based on a configured reporting time window length or semi-statically configured via control signaling received by the node. The predetermined nominal number of HARQ feedback bits may be received in the control information indicating resources in which data is to be received by the node.

In other embodiments, a computer program including instructions which, when executed by at least one processor of the wireless device 50, causes the at least one processor of the wireless device 50 to carry out the functionality of a feedback-receiving node, such as when it is engaged in Device-to-Device (D2D) communication with another node, such as the other D2D device. In these embodiments, the wireless device 50 is operable to transmit control information indicating resources in which data is to be received by the wireless device 50. The control information includes an ARI having a value indicating one of a plurality of predetermined sets of control channel resources for transmitting CQI feedback and HARQ feedback. The wireless device 50 is also operable to receive CQI feedback and HARQ in a control channel resource of a plurality of control channel resources in the predetermined set indicated by the value of the ARI. The specific control channel resource to be used within that set is selected, i.e., determined, based on a number of bits to be reported for CQI feedback and for HARQ feedback.

The wireless device 50 may be configured to perform a corresponding method 400 for receiving CQI and HARQ feedback. The method 400 includes transmitting control information indicating resources in which data is to be received by another node (e.g., other D2D device), the control information comprising an ARI having a value indicating one of a plurality of predetermined sets of control channel resources for transmitting CQI feedback and HARQ feedback (block 402). The method 400 also includes receiving CQI feedback and HARQ in a control channel resource of a plurality of control channel resources in the predetermined set indicated by the value of the ARI, the control channel resource selected based on a number of bits to be reported for CQI feedback and for HARQ feedback (block 404).

In these cases, the wireless device 50 is engaged in device-to-device communications with the other node, and the control information indicating resources in which data is to be received by the other node is downlink control information transmitted to the other node. The HARQ feedback may be for at least data received in the resources indicated in the control information.

Figure 5:
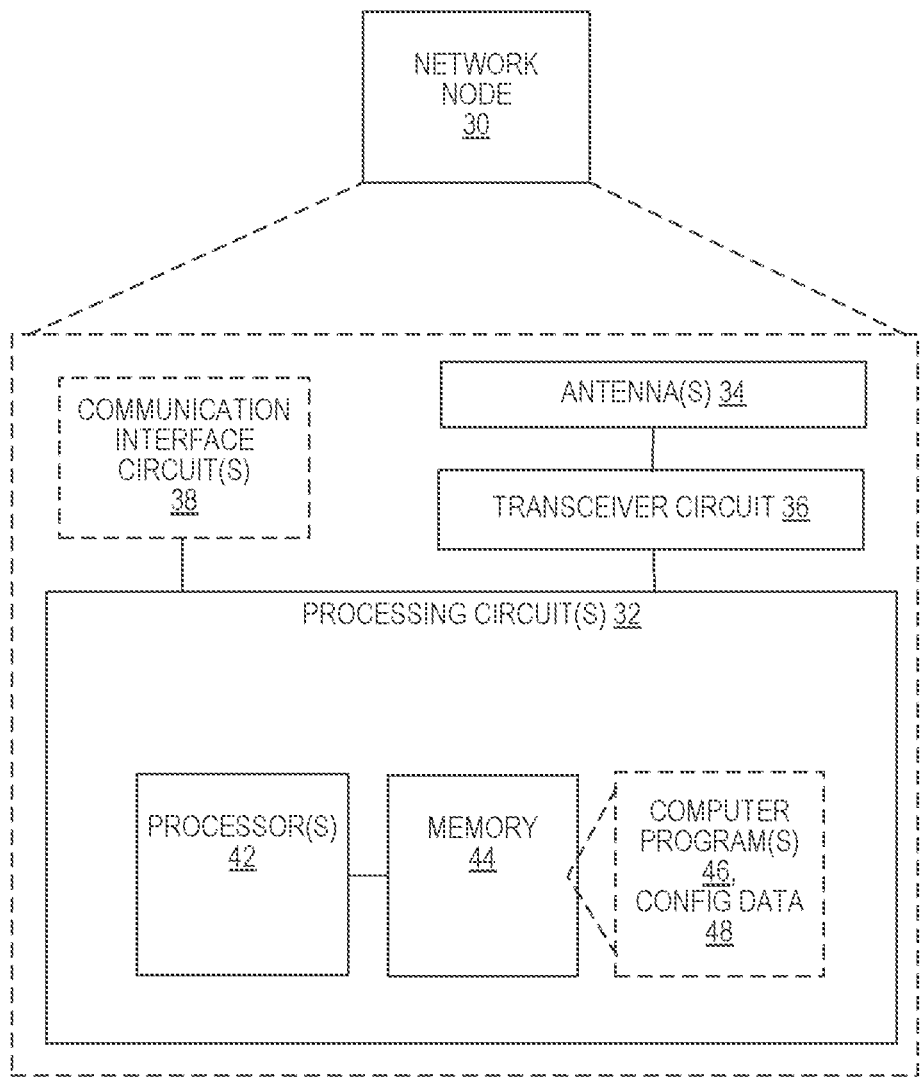
FIG. 5 is a block diagram illustrating a network node, according to some embodiments.

FIG. 5 is a block diagram illustrating an access point of the wireless communication system, such as network node 30. In this example, the network node 30 may be a radio access node, Transmission and Reception Point (TRP), base station or other general radio node allowing communication within a radio network. Network node 30 may also represent, for example, a base transceiver station, a base station controller, a network controller, an enhanced or evolved Node B (eNB), a Node B, a gNB (access point supporting NR or 5G), Multi-cell/Multicast Coordination Entity (MCE), a relay node, an access point, a radio access point, or a Remote Radio Unit (RRU) Remote Radio Head (RRH). The network node 30 provides wireless access to other nodes such as wireless device 50 or other access nodes within a coverage area (e.g., cell) of the network node 30. The network node 30 described here in configured to operate in a NR network, but may be applicable to other networks or standards that utilize the techniques discussed herein.

As illustrated in FIG. 5, the network node 30 includes processing circuitry 32 comprising one or more processors 42 (e.g., CPUs, ASICs, FPGAs, and/or the like) and a memory 44 that stores computer programs 46 and, optionally, configuration data 48. The network node 30 may include communication interface circuitry 38 to communicate with the core network or other network nodes. The network node 30 also includes transceiver circuitry 36, which may include one or more transmitters and receivers coupled to one or more antennas 34, for communication with wireless devices, such as wireless device 50. In some embodiments, the functionality of the network node 30 described herein may be fully or partially implemented in software that is, for example, stored in the memory 44 and executed by the processor(s) 42.

In some embodiments, the memory 44 of the network node 30 stores instructions that when executed by one or more of the processors 42 configures the network node 30 to operate as a feedback-receiving node that receives CQI and HARQ feedback. The network node 30 is operable to transmit control information indicating resources in which data is to be received by another node (e.g., wireless device or access node). The control information includes an ARI having a value indicating one of a plurality of predetermined sets of control channel resources for transmitting CQI feedback and HARQ feedback. The network node 30 is also operable to receive CQI feedback and HARQ in a control channel resource of a plurality of control channel resources in the predetermined set indicated by the value of the ARI. The control channel resource is selected based on a number of bits to be reported for CQI feedback and for HARQ feedback. The network node 30 is also operable to perform the method 400, but from the viewpoint of an access node.

Figure 6:
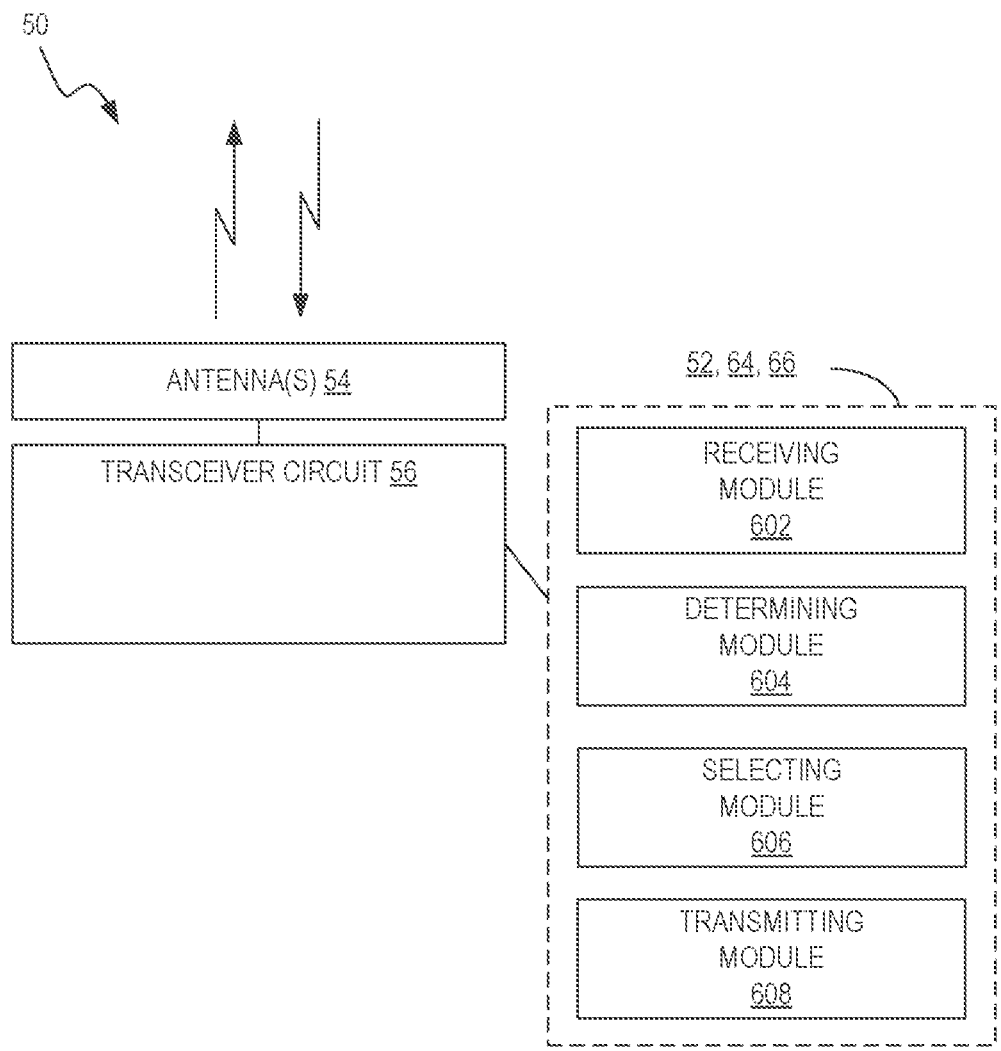
FIG. 6 is an example functional implementation in a wireless device, according to some embodiments.
Figure 7:
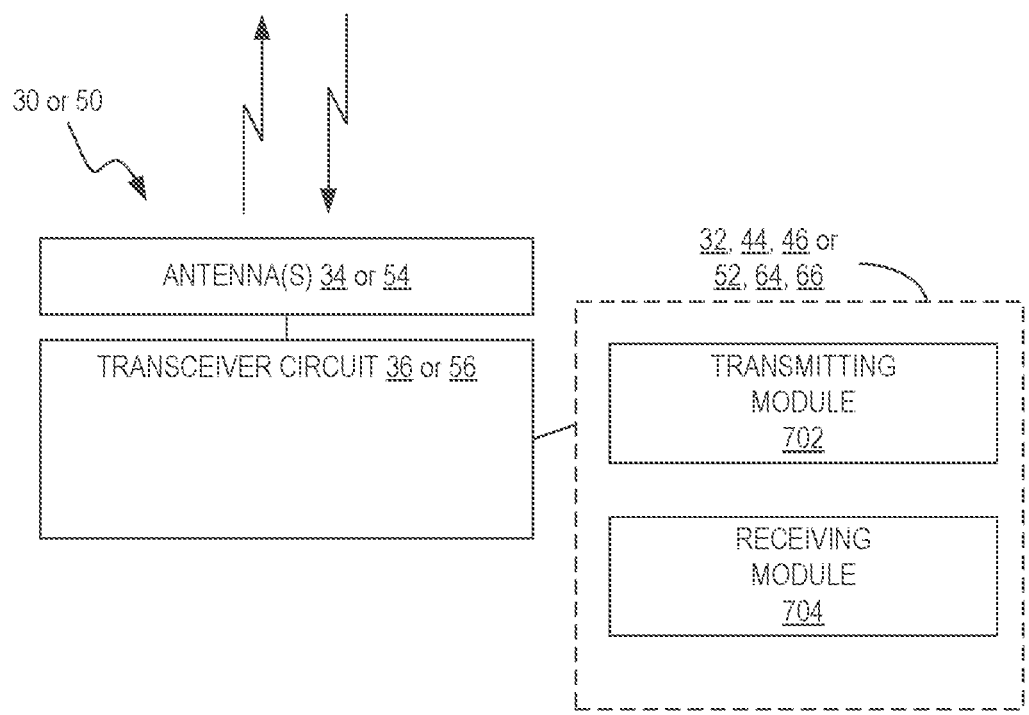
FIG. 7 is an example functional implementation in a wireless device or network node, according to some embodiments.

FIG. 6 is a schematic block diagram of a node (e.g., the wireless device 50) according to some other embodiments of the present disclosure. The node includes one or more modules, each of which is implemented in software. The module(s) provide the functionality of the node and include a receiving module 602 for receiving control information indicating resources in which data is to be received by the node, the control information comprising an ARI having a value indicating one of a plurality of predetermined sets of control channel resources for transmitting CQI feedback and HARQ feedback. The implementation also includes a determining module 604 for determining a feedback payload size parameter, based on a number of bits to be reported for CQI feedback and for HARQ feedback. The implementation includes a selecting module 606 for selecting, from a plurality of control channel resources in the predetermined set of control channel resources indicated by the value of the ARI, one of the control channel resources of the predetermined set, based on the feedback payload size parameter. The implementation further includes a transmitting module 608 for transmitting CQI feedback and HARQ feedback in the selected control channel resource. FIG. 7 is a schematic block diagram of a node (e.g., D2D wireless device 50 or network node 30) according to some other embodiments of the present disclosure. The node includes one or more modules, each of which is implemented in software. The module(s) provide the functionality of the node and includes a transmitting module 702 for transmitting control information indicating resources in which data is to be received by another node, the control information comprising an ARI having a value indicating one of a plurality of predetermined sets of control channel resources for transmitting CQI feedback and HARQ feedback. The implementation also includes a receiving module 704 for receiving CQI feedback and HARQ in a control channel resource of a plurality of control channel resources in the predetermined set indicated by the value of the ARI, the control channel resource selected based on a number of bits to be reported for CQI feedback and for HARQ feedback.

EXAMPLE EMBODIMENTS

While not being limited thereto, some example embodiments of the present disclosure are provided below.

A. A method of operating a node to report channel quality indicator (CQI) feedback and hybrid automatic-repeat-request (HARQ) feedback, the method comprising:
receiving control information indicating resources in which data is to be received by the node, the control information comprising an ACK/NACK resource indicator (ARI) having a value indicating one of a plurality of predetermined sets of control channel resources for transmitting CQI feedback and HARQ feedback;
determining a feedback payload size parameter, based on a number of bits to be reported for CQI feedback and for HARQ feedback;
selecting, from a plurality of control channel resources in the predetermined set of control channel resources indicated by the value of the ARI, one of the control channel resources of the predetermined set, based on the feedback payload size parameter; and
transmitting CQI feedback and HARQ feedback in the selected control channel resource.

B. The method of embodiment A, wherein the control information indicating resources in which data is to be received by the node is downlink control information received from an access point of a wireless network, and wherein the predetermined sets of control channel resources for transmitting CQI feedback and HARQ feedback are uplink control channel resources.

C. The method of embodiment A, wherein the control information indicating resources in which data is to be received by the node is downlink control information received from another node engaged in device-to-device communications with the node.

D. The method of any of embodiments A-C, wherein the HARQ feedback is for at least data received in the resources indicated in the control information.

E. The method of any of embodiments A-D, wherein the feedback payload size parameter is determined further based on whether a scheduling request bit is to be sent in the selected control channel resource.

F. The method of any of embodiments A-E, wherein the feedback payload size parameter is computed as a weighted sum of at least a number of CQI feedback bits and a number of HARQ feedback bits, with a weight applied to the number of CQI feedback bits differing from a weight applied to the number of HARQ feedback bits.

G. The method of any of embodiments A-E, wherein the feedback payload size parameter is computed based on a number of HARQ feedback bits that is in turn based on a predetermined nominal number of HARQ feedback bits.

H. The method of embodiment G, wherein the predetermined nominal number of HARQ feedback bits is determined based on a configured reporting time window length.

I. The method of embodiment G, wherein the predetermined nominal number of HARQ feedback bits is semi-statically configured via control signaling received by the node.

J. The method of embodiment G, wherein the predetermined nominal number of HARQ feedback bits is received in the control information indicating resources in which data is to be received by the node.

K. A method of operating a node to receive channel quality indicator (CQI) feedback and hybrid automatic-repeat-request (HARQ) feedback, the method comprising:
transmitting control information indicating resources in which data is to be received by another node, the control information comprising an ACK/NACK resource indicator (ARI) having a value indicating one of a plurality of predetermined sets of control channel resources for transmitting CQI feedback and HARQ feedback; and
receiving CQI feedback and HARQ in a control channel resource of a plurality of control channel resources in the predetermined set indicated by the value of the ARI, the control channel resource selected based on a number of bits to be reported for CQI feedback and for HARQ feedback.

L. The method of embodiment K, wherein the node is an access point of a wireless network, wherein the control information indicating resources in which data is to be received by the other node is downlink control information transmitted by the access point to the other node, and wherein the predetermined sets of control channel resources for transmitting CQI feedback and HARQ feedback are uplink control channel resources.

M. The method of embodiment K, wherein the node is engaged in device-to-device communications with the other node, and wherein the control information indicating resources in which data is to be received by the other node is downlink control information transmitted to the other node.

N. The method of any of embodiments K-M, wherein the HARQ feedback is for at least data received in the resources indicated in the control information.

O. A node adapted to operate according to the method of any of embodiments A-N.

P. A node configured to report channel quality indicator (CQI) feedback and hybrid automatic-repeat-request (HARQ) feedback, the node comprising:
  at least one processor and
  a memory comprising instructions executable by the at least one processor whereby the node is operable to:
    receive control information indicating resources in which data is to be received by the node, the control information comprising an ACK/NACK resource indicator (ARI) having a value indicating one of a plurality of predetermined sets of control channel resources for transmitting CQI feedback and HARQ feedback;
    determine a feedback payload size parameter, based on a number of bits to be reported for CQI feedback and for HARQ feedback;
    select, from a plurality of control channel resources in the predetermined set of control channel resources indicated by the value of the ARI, one of the control channel resources of the predetermined set, based on the feedback payload size parameter and
    transmit CQI feedback and HARQ feedback in the selected control channel resource.

Q. The node of embodiment P, wherein the control information indicating resources in which data is to be received by the node is downlink control information received from an access point of a wireless network, and wherein the predetermined sets of control channel resources for transmitting CQI feedback and HARQ feedback are uplink control channel resources.

R. The node of embodiment P, wherein the control information indicating resources in which data is to be received by the node is downlink control information received from another node engaged in device-to-device communications with the node.

S. The node of any of embodiments P-R, wherein the HARQ feedback is for at least data received in the resources indicated in the control information.

T. The node of any of embodiments P-S, wherein the feedback payload size parameter is determined further based on whether a scheduling request bit is to be sent in the selected control channel resource.

U. The node of any of embodiments P-T, wherein the feedback payload size parameter is computed as a weighted sum of at least a number of CQI feedback bits and a number of HARQ feedback bits, with a weight applied to the number of CQI feedback bits differing from a weight applied to the number of HARQ feedback bits.

V. The node of any of embodiments P-T, wherein the feedback payload size parameter is computed based on a number of HARQ feedback bits that is in turn based on a predetermined nominal number of HARQ feedback bits.

W. The node of embodiment V, wherein the predetermined nominal number of HARQ feedback bits is determined based on a configured reporting time window length.

X. The node of embodiment V, wherein the predetermined nominal number of HARQ feedback bits is semi-statically configured via control signaling received by the node.

Y. The node of embodiment V, wherein the predetermined nominal number of HARQ feedback bits is received in the control information indicating resources in which data is to be received by the node.

Z. A node configured to receive channel quality indicator (CQI) feedback and hybrid automatic-repeat-request (HARQ) feedback, the node comprising:
  at least one processor; and a memory comprising instructions executable by the at least one processor whereby the node is operable to:
    transmit control information indicating resources in which data is to be received by another node, the control information comprising an ACK/NACK resource indicator (ARI) having a value indicating one of a plurality of predetermined sets of control channel resources for transmitting CQI feedback and HARQ feedback; and
    receive CQI feedback and HARQ in a control channel resource of a plurality of control channel resources in the predetermined set indicated by the value of the ARI, the control channel resource selected based on a number of bits to be reported for CQI feedback and for HARQ feedback.

AA. The node of embodiment Z, wherein the node is an access point of a wireless network, wherein the control information indicating resources in which data is to be received by the other node is downlink control information transmitted by the access point to the other node, and wherein the predetermined sets of control channel resources for transmitting CQI feedback and HARQ feedback are uplink control channel resources.

BB. The node of embodiment Z, wherein the node is engaged in device-to-device communications with the other node, and wherein the control information indicating resources in which data is to be received by the other node is downlink control information transmitted to the other node.

CC. The node of any of embodiments Z-BB, wherein the HARQ feedback is for at least data received in the resources indicated in the control information.

DD. A computer program product comprising program instructions for a processor in a node, wherein said program instructions are configured so as to cause the node, when the program instructions are executed by the processor, to:
  receive control information indicating resources in which data is to be received by the node, the control information comprising an ACK/NACK resource indicator (ARI) having a value indicating one of a plurality of predetermined sets of control channel resources for transmitting channel quality indicator (CQI) feedback and hybrid automatic-repeat-request (HARQ) feedback:
  determine a feedback payload size parameter, based on a number of bits to be reported for CQI feedback and for HARQ feedback;
  select, from a plurality of control channel resources in the predetermined set of control channel resources indicated by the value of the ARI, one of the control channel resources of the predetermined set, based on the feedback payload size parameter; and
  transmit CQI feedback and HARQ feedback in the selected control channel resource.

EE. A computer program product comprising program instructions for a processor in a node, wherein said program instructions are configured so as to cause the node, when the program instructions are executed by the processor, to:
  transmit control information indicating resources in which data is to be received by another node, the control information comprising an ACK/NACK resource indicator (ARI) having a value indicating one of a plurality of predetermined sets of control channel resources for transmitting channel quality indicator (CQI) feedback and hybrid automatic-repeat-request (HARQ) feedback; and receive CQI feedback and HARQ in a control channel resource of a plurality of control channel resources in the predetermined set indicated by the value of the ARI, the control channel resource selected based on a number of bits to be reported for CQI feedback and for HARQ feedback.

FF. A non-transitory computer-readable medium comprising, stored thereupon, the computer program product of embodiment DD or EE.

GG. A node adapted to report channel quality indicator (CQI) feedback and hybrid automatic-repeat-request (HARQ) feedback, the node comprising:
- a receiving module for receiving control information indicating resources in which data is to be received by the node, the control information comprising an ACK/NACK resource indicator (ARI) having a value indicating one of a plurality of predetermined sets of control channel resources for transmitting CQI feedback and HARQ feedback;
- a determining module for determining a feedback payload size parameter, based on a number of bits to be reported for CQI feedback and for HARQ feedback;
- a selecting module for selecting, from a plurality of control channel resources in the predetermined set of control channel resources indicated by the value of the ARI, one of the control channel resources of the predetermined set, based on the feedback payload size parameter; and
- a transmitting module for transmitting CQI feedback and HARQ feedback in the selected control channel resource.

HH. A node adapted to receive channel quality indicator (CQI) feedback and hybrid automatic-repeat-request (HARQ) feedback, the node comprising:
- a transmitting module for transmitting control information indicating resources in which data is to be received by another node, the control information comprising an ACK/NACK resource indicator (ARI) having a value indicating one of a plurality of predetermined sets of control channel resources for transmitting CQI feedback and HARQ feedback; and
- a receiving module for receiving CQI feedback and HARQ in a control channel resource of a plurality of control channel resources in the predetermined set indicated by the value of the ARI, the control channel resource selected based on a number of bits to be reported for CQI feedback and for HARQ feedback.

Those skilled in the art will recognize improvements and modifications to the embodiments of the present disclosure. All such improvements and modifications are considered within the scope of the concepts disclosed herein.

What is claimed is:

1. A method of operating a node to report channel quality indicator (CQI) feedback and hybrid automatic-repeat-request (HARQ) feedback, the method comprising:
   receiving control information that indicates resources in which data is to be received by the node and that comprises an ACK/NACK resource indicator (ARI) having a value that indicates one of a plurality of predetermined sets of control channel resources for transmitting CQI feedback and HARQ feedback, wherein the predetermined set of control channel resources indicated by the ARI includes a plurality of control channel resources;
   determining a feedback payload size parameter, based on a number of bits to be reported for CQI feedback and for HARQ feedback;
   selecting, from the plurality of control channel resources in the predetermined set of control channel resources indicated by the value of the ARI, one of the control channel resources of the predetermined set, based on the feedback payload size parameter; and
   transmitting CQI feedback and HARQ feedback in the selected control channel resource.

2. The method of claim 1, wherein the control information that indicates resources in which data is to be received by the node is downlink control information (DCI) received from an access point of a wireless network, and wherein the predetermined sets of control channel resources for transmitting CQI feedback and HARQ feedback are uplink control channel resources.

3. The method of claim 1, wherein the control information indicating that indicates resources in which data is to be received by the node is downlink control information received from another node engaged in device-to-device communications with the node.

4. The method of claim 1, wherein the HARQ feedback is for at least data received in the resources indicated in the control information.

5. The method of claim 1, wherein the feedback payload size parameter is determined further based on whether a scheduling request bit is to be sent in the selected control channel resource.

6. The method of claim 1, wherein the feedback payload size parameter is computed as a weighted sum of at least a number of CQI feedback bits and a number of HARQ feedback bits, with a weight applied to the number of CQI feedback bits differing from a weight applied to the number of HARQ feedback bits.

7. The method of claim 1, wherein the feedback payload size parameter is computed based on a number of HARQ feedback bits that is in turn based on a predetermined nominal number of HARQ feedback bits.

8. The method of claim 7, wherein the predetermined nominal number of HARQ feedback bits is determined based on a configured reporting time window length.

9. The method of claim 7, wherein the predetermined nominal number of HARQ feedback bits is semi-statically configured via control signaling received by the node.

10. A method of operating a node to receive channel quality indicator (CQI) feedback and hybrid automatic-repeat-request (HARQ) feedback, the method comprising:
    transmitting control information that indicates resources in which data is to be received by another node and that comprises an ACK/NACK resource indicator (ARI) having a value that indicates one of a plurality of predetermined sets of control channel resources for transmitting CQI feedback and HARQ feedback, wherein the predetermined set of control channel resources indicated by the ARI includes a plurality of control channel resources; and
    receiving, from the another node, CQI feedback and HARQ feedback in a control channel resource in the predetermined set indicated by the value of the ARI, the control channel resource selected based on a number of bits to be reported for the CQI feedback and for the HARQ feedback.

11. The method of claim 10, wherein the node is an access point of a wireless network, wherein the control information that indicates resources in which data is to be received by the other node is downlink control information transmitted by the access point to the other node, and wherein the predetermined sets of control channel resources for transmitting CQI feedback and HARQ feedback are uplink control channel resources.

12. The method of claim 10, wherein the node is engaged in device-to-device communications with the other node, and wherein the control information that indicates resources in which data is to be received by the other node is downlink control information transmitted to the other node.

13. A user equipment (UE) configured to report channel quality indicator (CQI) feedback and hybrid automatic-repeat-request (HARQ) feedback, the UE comprising:
   at least one processor; and
   a memory comprising instructions executable by the at least one processor whereby the UE is configured to:
      receive control information that indicates resources in which data is to be received by the node and that comprises an ACK/NACK resource indicator (ARI) having a value that indicates one of a plurality of predetermined sets of control channel resources for transmitting CQI feedback and HARQ feedback, wherein the predetermined set of control channel resources indicated by the ARI includes a plurality of control channel resources;
      determine a feedback payload size parameter, based on a number of bits to be reported for CQI feedback and for HARQ feedback;
      select, from the plurality of control channel resources in the predetermined set of control channel resources indicated by the value of the ARI, one of the control channel resources of the predetermined set, based on the feedback payload size parameter; and
      transmit CQI feedback and HARQ feedback in the selected control channel resource.

14. The UE of claim 13, wherein the control information that indicates resources in which data is to be received by the UE is downlink control information received from an access point of a wireless network, and wherein the predetermined sets of control channel resources for transmitting CQI feedback and HARQ feedback are uplink control channel resources.

15. The UE of claim 13, wherein the control information that indicates resources in which data is to be received by the UE is downlink control information received from another UE engaged in device-to-device communications with the UE.

16. The UE of claim 13, wherein the HARQ feedback is for at least data received in the resources indicated in the control information.

17. The UE of claim 13, wherein the feedback payload size parameter is determined further based on whether a scheduling request bit is to be sent in the selected control channel resource.

18. The UE of claim 13, wherein the feedback payload size parameter is computed as a weighted sum of at least a number of CQI feedback bits and a number of HARQ feedback bits, with a weight applied to the number of CQI feedback bits differing from a weight applied to the number of HARQ feedback bits.

19. The UE of claim 13, wherein the feedback payload size parameter is computed based on a number of HARQ feedback bits that is in turn based on a predetermined nominal number of HARQ feedback bits.

20. The UE of claim 19, wherein the predetermined nominal number of HARQ feedback bits is determined based on a configured reporting time window length.

21. The UE of claim 19, wherein the predetermined nominal number of HARQ feedback bits is semi-statically configured via control signaling received by the UE.

22. The UE of claim 19, wherein the predetermined nominal number of HARQ feedback bits is received in the control information indicating resources in which data is to be received by the UE.

23. A node configured to receive channel quality indicator (CQI) feedback and hybrid automatic-repeat-request (HARQ) feedback, the node comprising:
   at least one processor; and
   a memory comprising instructions executable by the at least one processor whereby the node is operable to:
      transmit control information that indicates resources in which data is to be received by another node and that comprises an ACK/NACK resource indicator (ARI) having a value that indicates one of a plurality of predetermined sets of control channel resources for transmitting CQI feedback and HARQ feedback, wherein the predetermined set of control channel resources indicated by the ARI includes a plurality of control channel resources; and
      receive, from the another node, CQI feedback and HARQ feedback in a control channel resource in the predetermined set indicated by the value of the ARI, the control channel resource selected based on a number of bits to be reported for the CQI feedback and for the HARQ feedback.

24. The node of claim 23, wherein the node is an access point of a wireless network, wherein the control information that indicates resources in which data is to be received by the other node is downlink control information transmitted by the node to the other node, and wherein the predetermined sets of control channel resources for transmitting CQI feedback and HARQ feedback are uplink control channel resources.

25. The node of claim 23, wherein the node is engaged in device-to-device communications with the other node, and wherein the control information that indicates resources in which data is to be received by the other node is downlink control information transmitted to the other node.

26. The node of claim 23, wherein the HARQ feedback is for at least data received in the resources indicated in the control information.

* * * * *